US011653288B2

(12) United States Patent
Balasubramanian (10) Patent No.: US 11,653,288 B2
(45) Date of Patent: May 16, 2023

(54) TAI MANAGEMENT FOR CBRS NETWORKS TO PREVENT DENIAL OF SERVICE

(71) Applicant: Celona, Inc., Cupertino, CA (US)

(72) Inventor: Srinivasan Balasubramanian, San Diego, CA (US)

(73) Assignee: Celona, Inc., Campbell, CA (US)

( * ) Notice: Subject to any disclaimer, the term of this patent is extended or adjusted under 35 U.S.C. 154(b) by 0 days.

(21) Appl. No.: 17/530,673

(22) Filed: Nov. 19, 2021

(65) Prior Publication Data

US 2022/0167247 A1 May 26, 2022

Related U.S. Application Data (60) Provisional application No. 63/116,735, filed on Nov. 20, 2020.

(51) Int. Cl.
*H04W 48/02* (2009.01)
*H04W 12/08* (2021.01)
*H04W 8/20* (2009.01)

(52) U.S. Cl.
CPC ............ *H04W 48/02* (2013.01); *H04W 8/20* (2013.01); *H04W 12/08* (2013.01)

(58) Field of Classification Search
CPC ........ H04W 48/02; H04W 8/20; H04W 12/08
USPC ....................................................... 455/411
See application file for complete search history.

(56) References Cited

U.S. PATENT DOCUMENTS

| 10,419,943 | B1 | 9/2019 | Wong et al. |
| 2003/0120601 | A1 | 6/2003 | Ouye et al. |
| 2013/0337822 | A1 | 12/2013 | Rubin et al. |
| 2014/0295837 | A1 | 10/2014 | Madasamy |
| 2015/0101995 | A1 | 4/2015 | Kim |

OTHER PUBLICATIONS

Harry, Kim, International Search Report and Written Opinion received from the USRO dated Feb. 23, 2022 for appln No. PCT/US2021/060024, 18 pgs.
CBRS Alliance, "CBRS Alliance Identifier Administration Guidelines for Shared HNI", Jan. 21, 2019. Retrieved an Jan. 16, 2022 from https://ongoalliance.org/wp-content/uploads/2021/CVRSA-TR-0101-V1.0_Published-January-212019.pdf> entire document.

*Primary Examiner* — Joel Ajayi
(74) *Attorney, Agent, or Firm* — Jaquez Land Greenhaus & McFarland LLP; Bruce W. Greenhaus, Esq.

(57) ABSTRACT

A method and apparatus for managing TACs and TAIs used in communications system is disclosed in which "associated TACs" are used on a global basis and "unassociated TACs" are used on a regional basis. Associated TACs are associated with International Mobile Subscriber Identify (IMSI) Bin Numbers (IBNs). The value of each associated TACs is determined based on an associated IBN that serves as a seed for generating the TAC value. Unassociated TACs are TAC values that are within the "TAC space" of valid TAC values, but that are not within the pool of associated TACs. In some embodiments, there are 60,000 associated TACs and 65,536 total TAC values in the TAC space. Therefore, in such embodiments, there are 5,536 unassociated TACs that are regionally managed.

9 Claims, 4 Drawing Sheets

|                | Administered portion | Operator portion |
|----------------|---------------------|------------------|
| NID            | 27 bits (~134M)     |                  |
| IMSI    SHNI   | 4 digit IBN (10,000)| UIN (100,000)    |
| ECGI    SHNI   | 20 bit Macro eNB ID (~1M) | 256        |
| GUMMEI  SHNI   | 16 bit MMEGI (~64k) | 256              |
| TAI     SHNI   | TAC (~64k)          |                  |

Shared HNI

TAI MANAGEMENT FOR CBRS NETWORKS TO PREVENT DENIAL OF SERVICE

CLAIM OF PRIORITY—CROSS REFERENCE TO RELATED APPLICATIONS

This application claims priority under 35 USC section 111 (b) and under 35 USC section 119 (e), to earlier-filed provisional application No. 63/116,735 filed Nov. 20, 2020, entitled "TAI Management for CBRS Networks to Prevent Denial of Service"; and the contents of this earlier-filed provisional application (App. No. 63/116,735) are hereby incorporated by reference herein as if set forth in full.

BACKGROUND

(1) Technical Field

The disclosed method and apparatus relate generally to wireless networks and more particular to managing identifiers within a citizen band radio service (CBRS) network.

(2) Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their enterprise location, and digital solutions more generally, to improve efficiency and reduce costs. For the purposes of this disclosure, an enterprise may be a business, such as a large multi-national corporation, a small business, such as a car dealership, a governmental agency, or any other organization having a particular campus on which it would be useful for the enterprise to have access to a private wireless enterprise communication network (an "enterprise network"). Enterprises benefit from optimizing their computing, storage and networking infrastructure, and improving performance of the business applications within their business location. For this purpose, wireless network systems that make effective use of the spectrum within a business enterprise for wireless communication, improve the efficiency of communication within the organization and between the organization and the external entities. This improved communication capability at the enterprise location increases business efficiency and reduces cost. Business use cases include: fixed wireless internet service; in building private enterprise network service; mobile broadband networks; industrial IoT; educational IoT; health IoT; communications within public venues (sports stadiums, airports, shopping malls, hotels, etc.), neutral host, etc.

Figure 1:
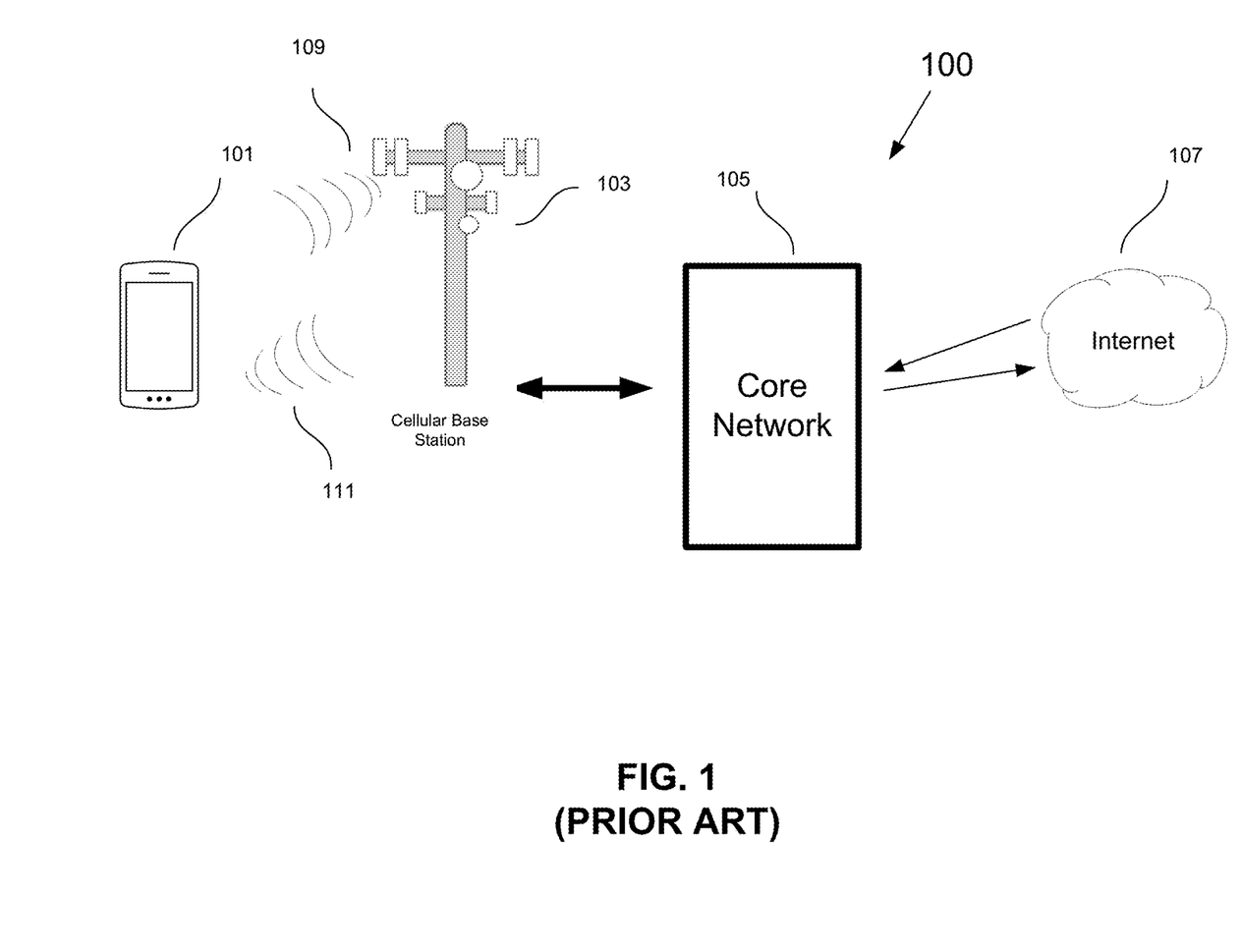
FIG. 1 is an illustration of a basic configuration for a communication network.

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs

As used herein, the term "UE" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement. In the illustration of FIG. 1, the UEs 101 include a first mobile phone 101a, a second mobile phone 101b, a laptop computer 101c, and a printer 101d.

The UEs 101 connect wirelessly over communication links 105 to a Radio Access Network (RAN) 107 that includes a base station/access point (BS/AP) 109. One of the advantages of such networks is their ability to provide communications to and from multiple UEs and provide these wireless UEs with access to a large number of other devices and services even though the devices may be mobile and moving from location to location.

BS/APs

The term 'BS/AP' is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

CBRS Networks

Another type of wireless network that recently became available for general use by enterprises at their enterprise locations is a Citizen's Broadband Radio Service (CBRS) network. These CBRS networks utilizes the CBRS radio band of 3550-3700 MHz, nominally divided into fifteen channels of 10 MHz each. Particularly, the FCC recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices.

Figure 2:
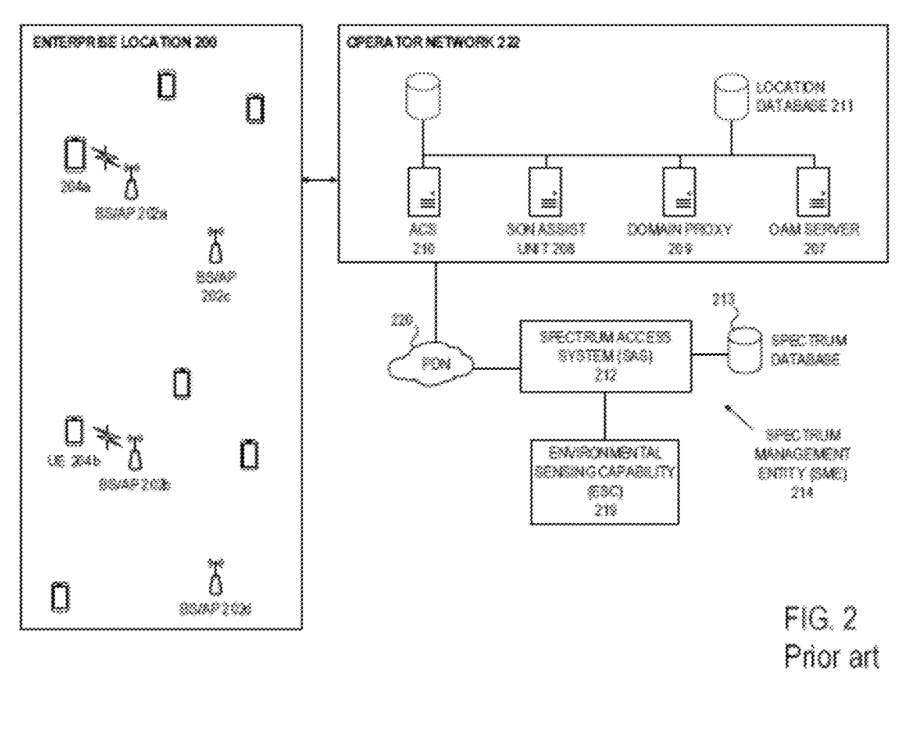
FIG. 2 is a diagram of a wireless communication network implemented as an enterprise network using a CBRS system.

FIG. 2 is a diagram of a wireless communication network implemented as an enterprise network using a CBRS system. A plurality of BS/APs 201a, 201b, 201c, 201d are deployed in an enterprise location 200. It should be noted that throughout this disclosure, a reference string (such as "201a") used to identify a feature in a figure, having a string of numeric characters followed by one or more alphabetic characters, identifies a feature of the figure that is similar to other features in the figures having the same numeric string of characters. For example, the BS/AP 201a is similar to the BS/AP 201b, 201c and 201d. Furthermore, a reference string having only the numeric string (i.e., lacking the alphabetic characters) refers collectively to all of the features having the same numeric string. For example, the BS/AP 201 refers collectively to all four of the BS/APs 201a, 201b, 201c and 201d.

In FIG. 2, each BS/AP 201 has a range, defining a wireless coverage area. The BS/APs 201 may be CBSDs in a CBRS system. A first UE 202a is wirelessly connected to a first BS/AP 201a, which is providing service to it. A second UE 202b is wirelessly connected to a second BS/AP 201b, and is providing service to that second UE 202b. Other UEs 202, which connect to the BS/APs 201, are shown in the enterprise location 200. All the BS/APs 201 are connected to a PDN 220 by any appropriate communication means, such as wire, fiber optic, and wireless radio. The PDN 220 provides a connection to an operator network 222 that includes an Oracle (OAM) Server 207, a SON assist unit 208, a Domain Proxy 209, an Automatic Configuration Server (ACS) 210 and a Location Database 211, all of which are connected to each other within the operator network 222 by any appropriate means. The MNO network is connected to an SAS 212, which is connected to a Spectrum Database 213 that includes data regarding the spectrum that SAS 212 is managing. Collectively, the SAS 212 and the Spectrum Database 213 are referred to as a Spectrum Management Entity (SME) 214.

In some of the literature, BS/APs 201 within a CBRS network are termed "CBSDs", and UEs 202 are termed End User Devices (EUDs). CBSDs are fixed Stations, or networks of such stations, that operate on a Priority Access (PA) or General Authorized Access (GAA) basis in the CBRS band consistent with Title 47 CFR Part 96 of the United States Code of Federal Regulations (CFR).

The CBRS rules require that a Spectrum Access System (SAS) allocate spectrum to the CBSDs to avoid interference within the CBRS band. The Spectrum Access System (SAS) is a service, typically cloud-based, that manages the spectrum used in wireless communications of devices transmitting in the CBRS band, in order to prevent harmful interference to higher priority users such as the military and priority licensees. A CBRS device (CBSD) needs authorization from the SAS before starting to transmit in the CBRS band. Even after authorization, the SAS may suspend or terminate authorization of one or more the channels previously authorized.

Regardless of complexities, the CBRS band provides an opportunity to create new wireless networks, and there is a desire for utilizing and making maximum use of spectrum in the CBRS band while following the rules pertaining the CBRS usage, including effectively responding to directions from the SAS.

Figure 3:
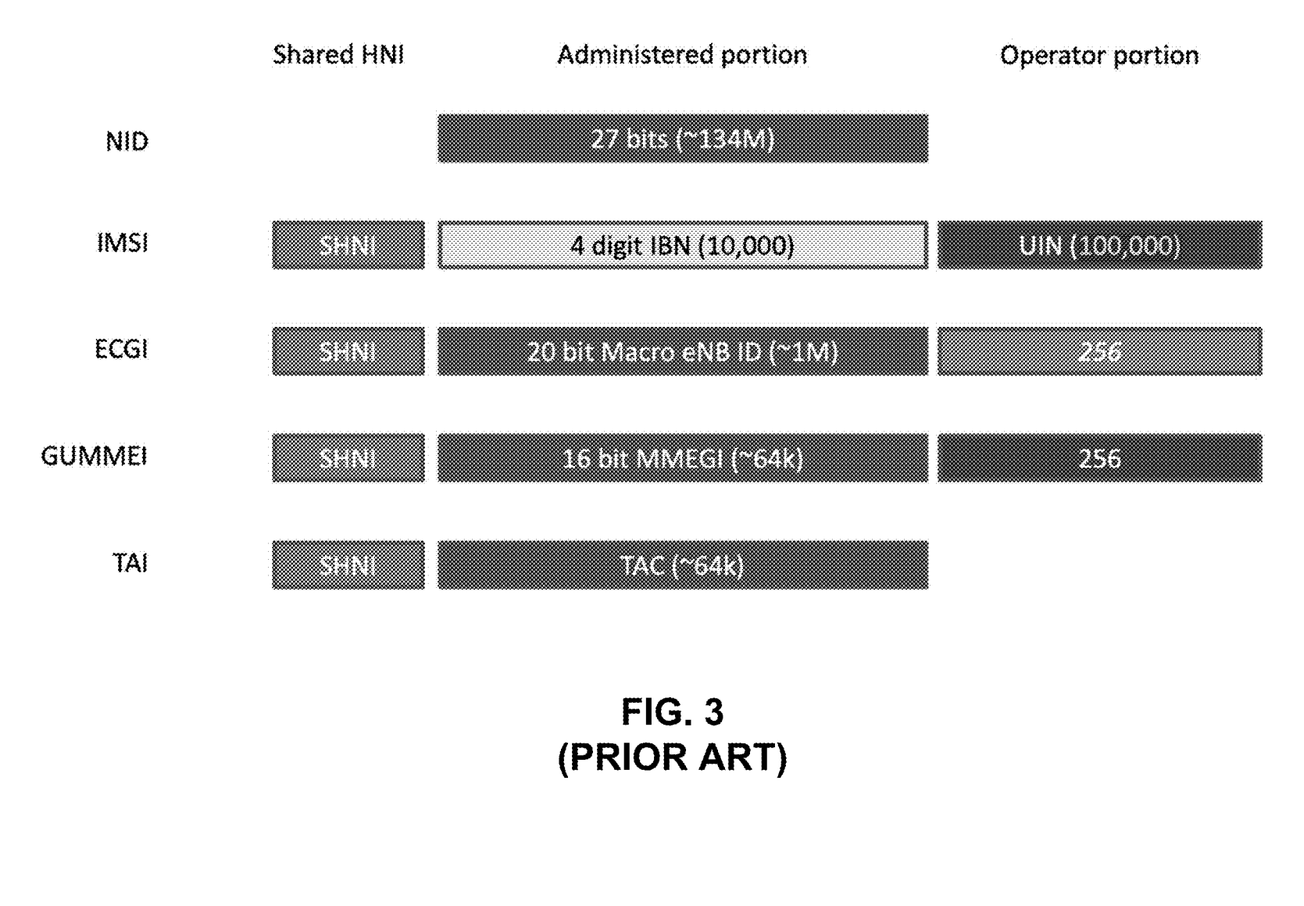
FIG. 3 is an illustration of some of the components of various identifiers and the source of those components.

FIG. 3 is an illustration of some of the components of various identifiers and the source of those components. Within CBRS networks, several identifiers are used for various purposes. These include a network identifier (NID), home network identifier (HNI), a shared HNI (SHNI), an international mobile subscriber identifier (IMSI), an E-UTRAN cell global identifier (ECGI), cell identifier (Cell-ID), a global unique mobility management entity (MME) identifier (GUMMEI), a tracking area identifier (TAI) and a tracking area code (TAC). Each of these will be discussed below. It should be noted that this is not an exhaustive list of the identifiers used in CBRS networks, but merely notes some of the identifiers that are discussed in this disclosure.

The NID for a CBRS network is based on a closed subscriber group identifier (CSG-ID) and supplements a shared home network identifier (SHNI). Taken together, the NID and the SHNI can provide a globally unique identify for a single SHNI network.

The SHNI is a specific combination of a 3-digit Mobile Country Code (MCC) and a 3-digit Mobile Network Code (MNC) that that together indicate that the network is using a SHNI. This code is shared by many operators, thus the name "shared". Accordingly, the SHNI is not unique to a single operator. At present there is just one such number (315-010), but there could be more in the future.

The IMSI is a 15-digit identifier and is stored in the subscriber identification module (SIM)/universal integrated circuit card (UICC) inserted or embedded in a UE. For devices provisioned for an SHNI network, the IMSI comprises the SHNI (i.e., as the MCC+MNC) concatenated with the MSIN (which comprises an IMSI block number (IBN) and user identification number (UIN)). Devices with an IMSI based on a non-shared HNI that roam into an SHNI Network (e.g. NHN) could continue to use their existing IMSI.

Every subscriber has an IMSI stored within their 'smart card' (SIM/UICC) or embedded in the device (eUICC). This 15-digit IMSI forms a globally unique wireless subscription identity consisting of HNI+MSIN (Mobile Subscription Identification Number). Normally an operator is assigned an HNI for exclusive use, and is responsible for assignment of the MSIN codes to subscribers. However, for an SHNI, MSIN is further broken down into IBN+UIN. A CBRS operator that has subscribers (i.e. 'smart cards' or UICC for each subscription, whether removable or embedded) is responsible for obtaining at least one IBN for their exclusive use. The SHNI+operator-specific IBN then forms the globally unique operator identifying IMSI. The CBRS operator is responsible for creating unique identifiers by allocating a different UIN to each subscriber/subscription. If the CBRS operator fails to obtain an operator-specific IBN for its subscribers, then the global uniqueness of their IMSIs is no longer guaranteed.

The EGCI is used to uniquely identify every LTE base station (eNodeB). The EGCI is composed of a NID (sometimes referred to as a PLMN-ID) and Cell ID. For the CBRS Network, the SHNI is used as the PLMN-ID within the ECGI.

The Cell-ID includes a macro eNB ID for the particular eNB.

The TAI is used to coordinate between neighboring CBRS LTE systems. When using a SHNI, operators need to coordinate the TAI, since the TAI is composed of the SHNI plus a 16-bit TAC. The TAC is the only unique part of the TAI, since the SHNI is shared by many networks. If a UE is rejected when presenting credentials to the network, the UE might not attempt to access any network broadcasting the same TAI as the network to which the UE was rejected for a significant period of time (e.g., several minutes). Therefore, it is important to coordinate the use of the TACs within TAIs. In order to ensure that the TACs are used in a manner that will not result in a user being blocked from accessing a network to which the user is a subscriber, it is suggested by the CBRS Alliance that the number of TACs be limited to 6 per IBN that has been purchased. Each IBN is expressed as a 4 decimal digit value from 0000-9999. If this is followed, then the number of total available TACs is 60,000 TACs=10,000 available IBNs×6 TACs per IBN for 4-digit IBNs. Therefore, there is a significant amount of "TAC space" that remains unused (i.e., 65,536–60,000=5,536). Currently, the CBRS Alliance recommends a method for defining the 6 TACs to be associated with an IBN. That method is to use the IBN value as a seed for determining six unique values of TACs. In this way, since each IBN is given to only one entity, no two entities would use the same TAC, and thus if a user's credentials fail during an attempt to camp on a network, the TAC associated with that failed attempt will not be the same as the TAC used by the network for which the user is a subscriber. In this way, any failed attempt which results in the TAC of the node on which the user attempted to camp can be placed on a "Forbidden TAC List" without affecting the user's ability to camp on the network to which the user subscribes.

According to the suggested method, the first of the six TACs would be the binary value of the IBN expressed as a 16-bit binary value. Accordingly, a binary value of "0000 0000 0000 0000" to "0010 0111 0000 1111" would serve as the value of the first TAC for each of the corresponding IBNs from 0000 to 9999. For example, for the entity possessing the IBN having the value 292 decimal, expressed as a binary value of "0000 0001 0010 0100", the first TAC would be a 16 bit value of "0000 0001 0010 0100". Accordingly, the nodes of that network would transmit this TAC value. Users having an IMSI formed with the IBN 292 would understand that to mean that they would be likely to be authorized to access that network.

The second TAC associated with an IBN is the value of the IBN+10,000. In the example of a IBN value of 292, the second TAC value would be the binary sum of 0000 0001 0010 0100 (the binary representation of 292) and 0010 0111 0001 0000 (the binary representation of 10,000)=0010 1000 0011 0100 (the binary representation of 10,292). The third TAC would be 0000 0001 0010 0100 (the binary representation of 292)+0100 1110 0010 0000 (the binary representation of 20,000)=0100 1111 0100 0100 (the binary representation of 20,292). The fourth TAC value would be 0000 0001 0010 0100 (the binary representation of 292)+0111 0101 0011 0000 (the binary representation of 30,000)=0111 0100 0111 0100=30,292. The fifth TAC would be the binary representation of 292+40,000=1001 1101 0110 0100 and the sixth would be the binary representation of 292 and 50,000=1100 0100 0111 0100.

Accordingly, if more than 6 TACs per IBN are required by a network, then to follow the above recommendation, the network has to purchase additional IBNs. If no additional IBNs are available, the only option is to reuse TACs. This, in turn, increases the likelihood that a given user visiting two enterprises using the same TAC will have valid credentials in only one of them. This will lead to the user being denied access to service and having an "attach/tracking area/service area/service reject message" occur. Once an "attach/tracking area/service reject message occurs, the TAI is potentially added to a "forbidden list" for as much as 12 hours.

If the UE receives an ATTACH REJECT, TRACKING AREA UPDATE REJECT or SERVICE REJECT message without integrity protection with EMM causes a value of #3, #6, #7, #8, #11, #12, #13, #14, #15 or #35 to be established before the network has established a secure exchange of non-access stratum (NAS) messages for the NAS signaling connection, the UE shall start timer T3247 (see 3GPP TS 24.008) with a random value uniformly drawn from the a range starting at 30 minutes and going to 60 minutes, if the timer is not running, and take the following actions: (1) if the EMM caused value received is #12, #13 or #15, the UE additionally proceeds as specified in subclauses 5.5.1, 5.5.3 and 5.6.1 defined by the 3GPP specification; and (2) Upon expiration of the timer T3247, the UE removes all tracking areas from the list of "forbidden tracking areas for regional provision of service" and the list of "forbidden tracking areas for roaming", which were stored in these lists for non-integrity protected NAS reject message.

Accordingly, it would be advantageous to provide a system that can assist in ensuring that there a UE does not attempt to gain access to a network to which it is not authorized and to which it will be denied service. Furthermore, it would be advantageous to provide a system that provides the most available uniquely defined TACs/TAIs possible.

SUMMARY

A method and apparatus for managing TACs and TAIs used in communications system is disclosed in which "associated TACs" are used on a global basis and "unassociated TACs" are used on a regional basis. Associated TACs are associated with International Mobile Subscriber Identify (IMSI) Bin Numbers (IBNs). The value of each associated TACs is determined based on an associated IBN that serves as a seed for generating the TAC value. Unassociated TACs are TAC values that are within the "TAC space" of valid TAC values, but that are not within the pool of associated TACs. In some embodiments, there are 60,000 associated TACs and 65,536 total TAC values in the TAC space. Therefore, in such embodiments, there are 5,536 unassociated TACs that are regionally managed.

In some embodiments, a network is restricted to transmitting only associated TACs that are based on an IBN used within an IMSI of at least one subscriber to that network or at least one IMSI owned by the same entity that owns at least one IMSI used by a subscriber to the network. In addition, the network can transmit unassociated TACs that have been assigned to the network by a local administrator. Unassociated TACs are managed on a regional basis to ensure that no confusion results that would block an authorized user from gaining access to a network to which the user subscribes.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

In accordance with the disclosed method and apparatus, the total number of available Tracking Area Codes (TACs) (i.e., unique identification values) that can be used to uniquely identify a network are increased while maintaining the recommended method for allocating TACs in association with IBNs. In addition, a method is implemented to provide reuse of at least some of the available TACs while avoiding the potential for a user to be blocked from accessing a network to which it is a subscriber.

In accordance with some embodiments, International Mobile Subscriber Identifier (IMSI) Bin Numbers (IBNs) are reduced from a 4-digit value to a 3-digit value. This reduces the total number IBNs that are available, since only 1,000 unique IBNs can be represented in 3 decimal digits. However, if the total number of digits used to define the combination of the IBN and the User Identification Number (UIN) remains the same, the number of subscribers that can be assigned to one IBN increases. That is, having the combination of IBN and UIN remain as a 9-digit decimal number, the UIN will have 6 decimal digits rather than 5 (i.e., one digit is given over from the IBN to the UIN). Accordingly, 1 million IMSIs can be allocated to an IBN. Since a 3-digit IBN results in 1,000 unique IBNs, each IBN can be associated with 64 TACs. Accordingly, 64 TACs will then be made available when an entity purchases an IBN. In this way, 64,000 TACs can be made uniquely available in association with the IBNs that are uniquely assigned to various entities for use in networks, as opposed to 60,000 TACs in the case in which the IBN is a 4-digit decimal number representing 10,000 IBNs, each with 6 TACs.

In some embodiments, either 3-digit or 4-digit IBNs can be purchased. Note deployment management is different for each of these two cases.

The TACs are expressed as a 16-bit binary value. Accordingly, there is the possibility to have $2^{16}$ unique TACs. In accordance with some embodiments, TAC values are reused in a manner that ensures that each TAC that is present in a "given region" is unique to that region and that any of the TACs used in one region are only reused in other regions that are far enough apart that users will not likely encounter the same TAC code until the user has had sufficient time to ensure that any block placed on the user attempting to camp on a network using that TAC will be lifted. That is, if a user attempts to camp on a network that is currently using a TAC, and the credentials for that user fail due to the user being a subscriber of another network transmitting the same TAC, the user may be blocked from attempting to camp on any network transmitting that TAC. Accordingly, in accordance with some embodiments of the presently disclosed system, the distance between two networks having the same TAC (and thus the same tracking area identifier (TAI) (see FIG. 3)) will be greater than the distance that the user can travel in the time than it takes for the block on the user to expire. In some embodiments, such travel is by foot, such as in the case in which regions are defined within a small campus and travel between regions is likely to be by foot. In other embodiments, travel is by automobile or other such mode of transportation. In either case, once the user leaves the service area of the first network using the TAI, the user will not likely enter the service area of any other network using that TAI for at least as long as it takes for the block on the user due to the failed attempt to camp on the first network to expire.

In some embodiments TACs are allocated on a region basis. Such TACs can potentially be dynamically assigned similar to the manner in which TDD configurations are dynamically assigned. This is possible as long as the timer to clear 'forbidden TAI' is short enough to ensure that the user will not encounter a second network having the same TAI until the forbidden TAI time expires.

In some embodiments, the assignment of the TAIs will be done in such a manner that a SHNI can be used by a non-CBRS entity without concern for confusion between various networks. That is, in some embodiments, non-CBRS entities may be assigning IMSIs that have a SHNI to subscribers and transmitting the SHNI together with a TAC (see FIG. 3). In such cases, the IMSI will also then include an IBN and UIN (see FIG. 3). Networks operated (or installed) that are using an SHNI will need to have a unique TAC, similar to CBRS networks. In some embodiments, such TACs are assigned in a manner that allows reuse. In some such embodiments, reuse of the TAI formed from the combination of the TAC and SHNI is controlled to ensure that the distance between networks that are assigned the same TAI minimizes the potential denial of service that can happen if a user attempts to camp on a network for which that user does not have valid credentials and then later encounters a network having the same TAI for which the user does have valid credentials.

In some embodiments, an entity that has purchased an IBN is limited to use of the 6 TAIs associated with the IBN purchased. However, if a given entity purchases more than 1 IBN, the entity may use the TACs associated with all of the IBNs purchased as though all of the TACs were associated with one IBN. Accordingly, networks can be organized such that any of the TAIs is transmitted by the network. This allows the TAIs to be used flexibly and independent of the IMSIs that are purchased with the IBNs to be allocated to an enterprise deployment. In some embodiments, when an entity is allocated multiple IBNs, each associated with multiple TACs, IMSIs containing the any of these IBNs can be issued to subscribers of any network transmitting at least one of the TACs without regard for matching the TACs to the IBNs.

Because there are 16 binary bits used to define the TACs, there are $2^{16}$=65,536 TACs that can be uniquely defined (and thus $2^{16}$ TAIs). However, as noted above, in cases in which a 4-digit IBN is used, there are only 6 TACs associated with each of the 10,000 IBNs for a total of 60,000 TACs that are determined using the IBNs as a seed for determining the TAC. Therefore, there are 5,536 TACs that are not associated with an IBN. For the purposes of this disclosure, these are referred to herein as "unassociated TACs", which include all of the TACs from 60,000 to 65,536. Likewise, the TAIs formed by concatenating the unassociated TACs with the SHNI are referred to as "unassociated TAIs". All of the other TACs, which include all of the TAC values from 0 (which is the first TAC associated with IBN 0) to 59,999 (which is associated with the sixth TAC associated with IBN 9,999) are referred to herein as "associated TACs", and likewise the TAIs formed by concatenating the associated TAC with the SHNI are referred to as "associated TAIs".

In some embodiments, the 5,536 unassociated TACs (i.e., 65,536−60,000=5,536) can be handled as a managed quantity. Assignment of these 5,536 unassociated TAIs can be made on a "region" basis by a regional administrator. That is, geographic regions can be defined in which networks operating in a defined region can be assigned TAIs formed with an unassociated TAC from among the 5,536 regionally managed TAIs formed using the unassociated TACs. The TAIs in each region can be controlled by the regional administrator (such as OnGo Alliance) to ensure that TAIs are not used in two regions that violate reuse provisions. Reuse provisions establish rules that, if adhered to, reduce the potential for confusion between networks that are associated with the same TAC. In some embodiments, such reuse provisions require that the regions are more than a predetermined distance apart. Reuse is allowed outside of the region, but only in other regions that are sufficiently distant from each other. The distance between regions that share a TAI will depend on the amount of time a given TAI is retained in the forbidden list and the typical amount of time that a given user is expected to take to move from one region to another.

When a user attempts to camp on a network, authentication is performed to allow the user access to the network. 6 TAIs are assigned to a network in connection with each IBN purchased by the network. If the user attempts to camp onto a node of the network and authenticate, the network will authenticate the user, assuming all credentials are in order. If however, the user is not authenticated, the TAI being transmitted by the network will be placed in a Forbidden TAI List for a period of time. The amount of time the TAI remains on the list will depend upon an algorithm used to prevent users from attempting to gain access to a network to which they are not authorized (e.g., by making multiple attempts to gain access, each of which is unsuccessful until the unauthorized user can determine the required credentials).

In another embodiment, the 5,536 unassociated TAIs (i.e., those are not included in the 60,000 TAIs associated with the IBNs that can be purchased) are dynamically allocated on a "region" basis. Control is maintained over the dynamic allocate to ensure that the same TAI will not be assigned to an entity within a second region that is too close to the first region (i.e., the region to which the TAI was previously assigned). The distance is too close if a given UE will be likely to travel from the first region to the second region before coming off the TAI forbidden list. That is, if a UE were to attempt to camp on the first network using the TAI and that attempt failed, then the UE would be placed on a TAI forbidden list. The UE would remain on the TAI forbidden list for a predetermined period. Accordingly, even if a user uses the TAI to attempt to camp on the first network without having proper credentials and is subsequently placed on a TAI forbidden list in connection with that TAI, the user will come off the forbidden TAI list before coming to the second network, thus allowing the user to successfully camp on the second network using that TAI, assuming the second network can validate the user's credentials.

In some embodiments, either at the time of installation or at a later time, the network operator may determine that additional TAIs are needed. While the network operator may purchase additional IBNs, assuming such additional IBNs are available, in the alternative, the network operator may request an administrator to issue unassociated TAIs (or unassociated TACs which can be used together with the SHNI of the network to form the unassociated TAIs). In some embodiments, the unassociated TAIs are purchased similar to the manner in which the network operator purchases an IBN and the 6 TAIs that are associated with the IBN. Alternatively, other arrangements are possible for the administrator to assign the TAIs to the network operator for use in the network. For example, the administrator may determine that unassociated TAIs should be distributed to all operational networks to increase the number of nodes that each such network can operate. Such a distribution might be made on the basis of the amount of current traffic that each network is expected to have or on some other basis related to the current and expected future requirement of each of the networks for which the administrator is responsible for managing.

In yet another embodiment, TAC allocation is segregated from the IBN purchase and the TAI is either statically or dynamically allocated on a "region" basis. In such embodiments, all $2^{16}$=65,536 TAIs are managed on a region basis.

Figure 4:
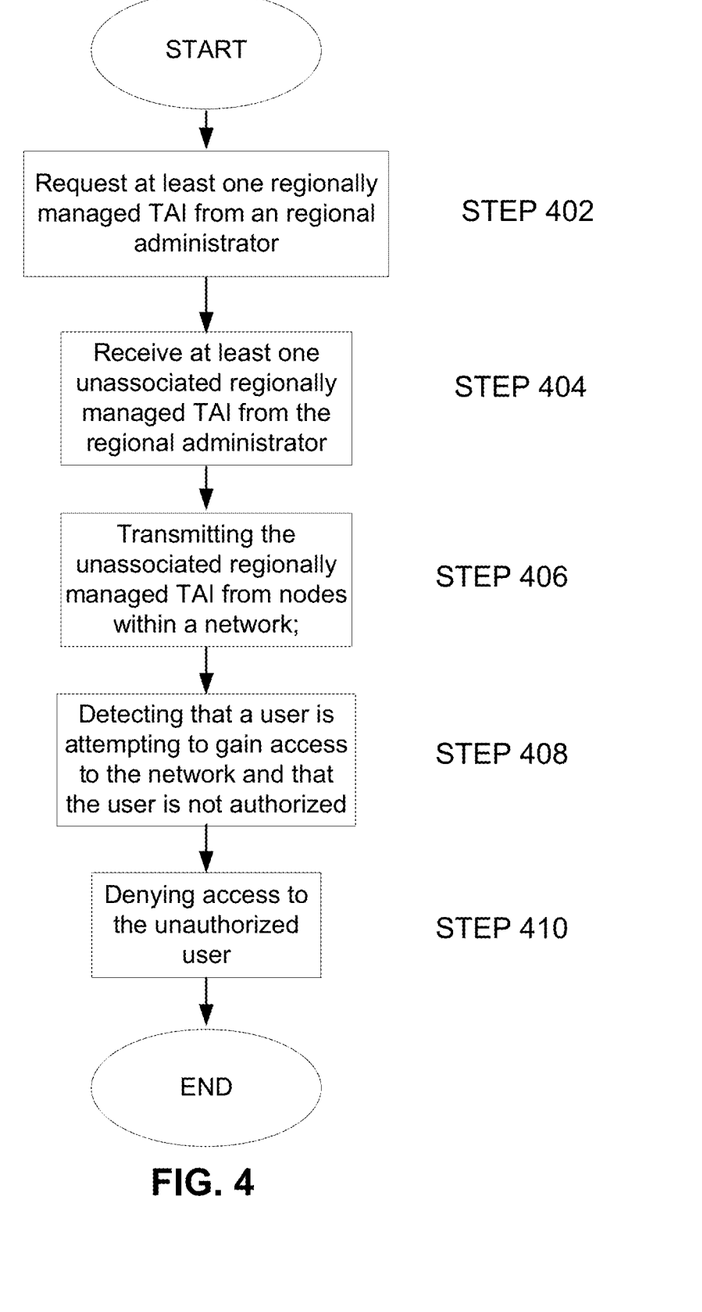
FIG. 4 is a flow diagram showing the manner in which a method is performed in accordance with one disclosed embodiment.

FIG. 4 is a flow diagram showing the manner in which a method is performed in accordance with one disclosed embodiment. Initially, a request is made for a regional administrator to provide at least one regionally managed TAI (STEP 402). In some embodiments, the regional administrator is the OnGo Alliance. In some embodiments, the regional administrator provides an unassociated TAI (STEP 404). As noted above, an unassociated TAI is a TAI that was not determined based on the value of an IBN. The unassociated regionally managed TAI is then provided to a network operating within the region. The network transmits the unassociated TAI from the nodes of the network (STEP 406). If a user attempts to gain access to the network, but is not a properly authorized subscriber, the network detects that a user is attempting to gain access to the network and that the user is not authorized (STEP 408). The network will then deny access to the unauthorized user (STEP 410). TAI is then placed on a Forbidden TAI List for a predetermined amount of time.

In some embodiments, networks are restricted from transmitting TACs other than the regionally managed TACs provided to the network by the regional administrator (either directly or indirectly through a third party) and "associated TACs" (i.e., those TAC that are associated with IBNs used by subscribers of the network or IBNs owned by the same entity that owns IBNs used by subscribers of the network).

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method performed by a wireless communication network for decreasing the likelihood that service will be denied to a UE (user equipment) based on a conflict of TAIs (tracking area identifiers), the method comprising:
   a) a network operator that is responsible for operating the wireless communication network sending a request message from the wireless communication network to a regional administrator for an unassociated TAI:
      i. the unassociated TAI not associated with an IBN (International mobile subscriber identify Bin Number);
      ii. the unassociated TAI having a value from 60,000 to 65,536; and
      iii. the unassociated TAI value being unique with respect to other networks within a predetermined distance of BS/APs (Base Station/Access Points) of the network, that distance defining a first region;
   b) receiving from the regional administrator, the unassociated TAI to be used to identify the network;
   c) transmitting the unassociated TAI from the network BS/APs within the first region to a UE, the transmitted unassociated TAI identifying the network; and
   d) upon detecting that a UE to which the unassociated TAI has been transmitted is attempting to gain access to the network and that the UE is authorized, allowing the UE access to the network and when the UE is not authorized to gain access, denying the UE access.

2. The method of claim 1, wherein upon detecting that the user is attempting to gain access to the network and that user is not authorized, transmitting a message to the UE that the UE is restricted from accessing any network transmitting the unassociated TAI for a predetermined time.

3. The method of claim 1, wherein the predetermined distance is greater than the distance that a user can travel in the predetermined time.

4. The method of claim 3, wherein the travel is by automobile.

5. The method of claim 3, wherein the travel is by foot.

6. The method of claim 1, wherein associated TAIs are transmitted by network nodes within the first region, each associated TAI having a value between 0 and 59,999, the value of the associated TAIs being determined based on an IBN value that has been purchased by the network.

7. The method of claim 1, wherein the network is allocated multiple IBNs, each associated with multiple TAIs, and wherein IMSIs containing one of these multiple IBNs are issued to subscribers of any network transmitting at least one of the multiple TAIs without regard for matching any of the multiple TAIs to any of the multiple IBNs.

8. The method of claim 1, wherein networks transmit only received unassociated TAIs and associated TAIs that are associated with IBNs used by subscribers of the network or IBNs owned by the same network that owns IBNs used by subscribers of the network.

9. The method of claim 8, wherein associated TAIs are allocated for use by networks without regard for the region in which the network operates.

* * * * *